Figure 1:
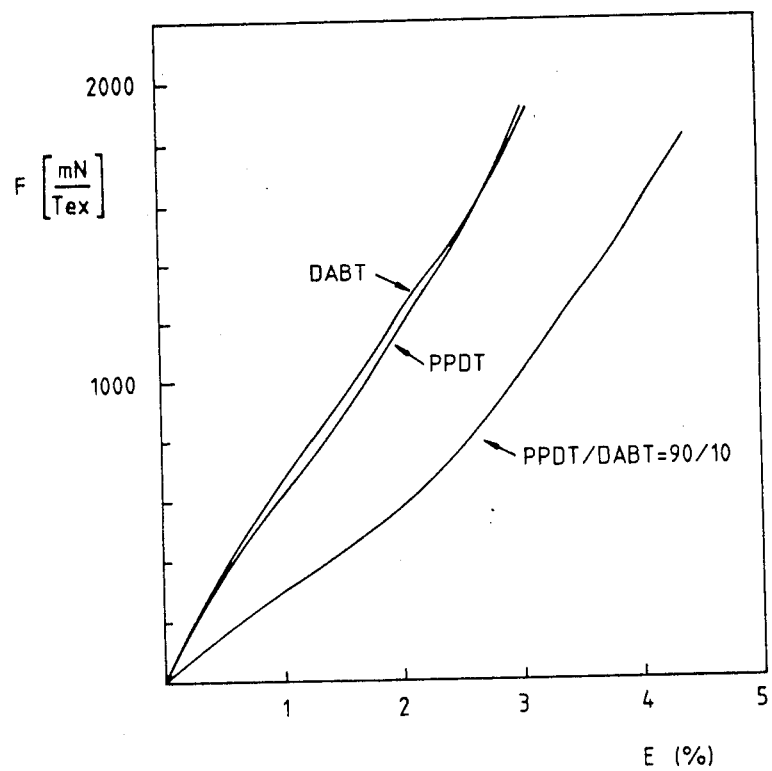

United States Patent [19]

Maatman

[11] Patent Number: 4,721,755
[45] Date of Patent: Jan. 26, 1988

[54] FIBERS AND YARNS FROM A BLEND OF AROMATIC POLYAMIDES

[75] Inventor: Hendrik Maatman, Arnhem, Netherlands

[73] Assignee: Akzo nv, Arnhem, Netherlands

[21] Appl. No.: 899,082

[22] Filed: Aug. 22, 1986

[30] Foreign Application Priority Data

Aug. 23, 1985 [NL] Netherlands ............... 8502318

[51] Int. Cl.$^4$ ............................................ C08L 77/00
[52] U.S. Cl. .................................................... 525/432
[58] Field of Search .......................................... 525/432

[56] References Cited

U.S. PATENT DOCUMENTS

| Re. 30,352 | 7/1980 | Kwolek | 524/422 |
| 3,414,645 | 12/1968 | Morgan . | |
| 4,120,914 | 10/1978 | Behnke et al. | 525/432 |
| 4,198,494 | 4/1980 | Burkel | 525/432 |
| 4,245,066 | 1/1981 | Nakagawa . | |

FOREIGN PATENT DOCUMENTS

2160878  1/1986  United Kingdom ............... 525/432

OTHER PUBLICATIONS

Fibre Chemistry, vol. 16, No. 4, Jul.-Aug. 1984, pp. 266-268, Plenum Publishing Corp., New York, "Effect of the Chemical Structure of Introduced Polymers on the Properties of Poly-p-Phenyleneterephtalamide Solutions".

*Primary Examiner*—Melvyn I. Marquis
*Assistant Examiner*—A. Carrillo
*Attorney, Agent, or Firm*—Stevens, Davis, Miller & Mosher

[57] ABSTRACT

Fibers substantially consisting of a blend of aromatic polyamides comprising poly-p-phenylene terephthalamide and up to 50 wt. % of a second polyamide of related structure containing diaminobenzanilide units.

The second polyamide should provide at least 0,1 wt. % of diaminobenzanilide units in the blend and is derived from aromatic monomers selected from the group comprising terephthalic acid, 4,4'-diamino benzanilide, p-phenylene diamine and p-amino benzoic acid. The fibers possess an elastic behavior particularly useful for tire yarn purposes.

3 Claims, 3 Drawing Figures

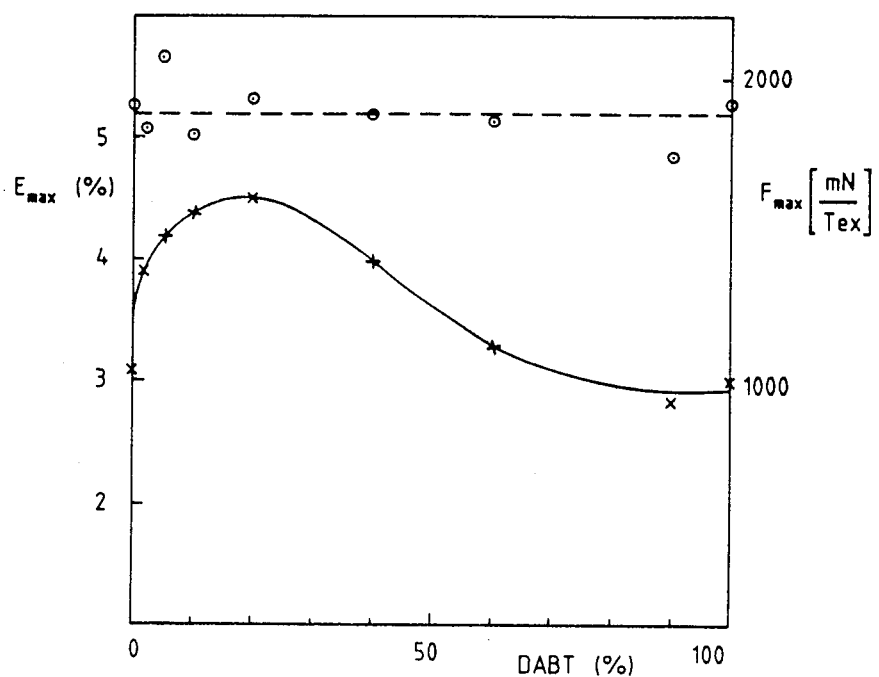
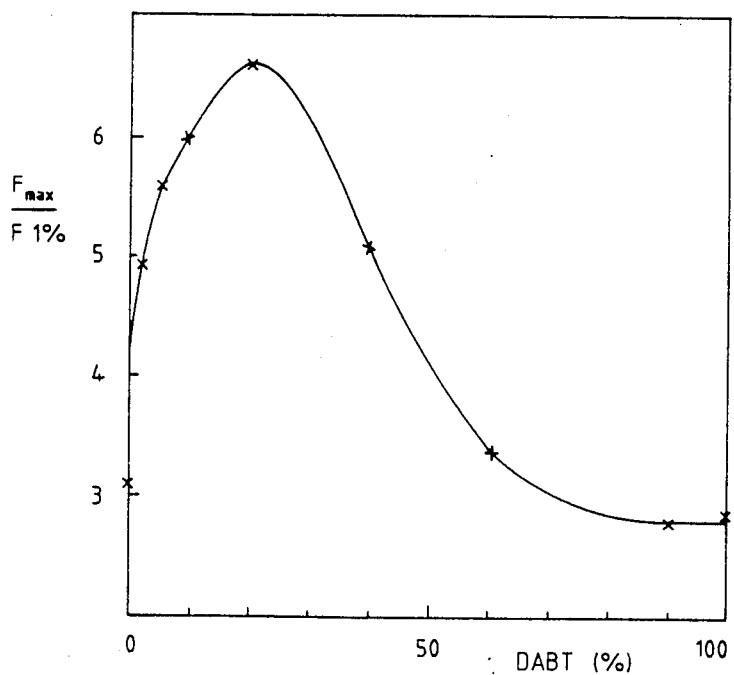

FIBERS AND YARNS FROM A BLEND OF AROMATIC POLYAMIDES

The invention relates to fibers which entirely or substantially consist of a blend of aromatic polyamides, and a yarn, more particularly tire yarn, entirely or partly composed of such fibers.

Fibers from aromatic polyamides are well-known and are preferably obtained by wet spinning from a solution in concentrated sulphuric acid, use being made of an air gap as indicated in U.S. Pat. No. 3,414,645.

Of industrial importance have meanwhile become especially fibers from poly-p-phenylene terephthalamide (PPDT). Because of their special properties, including notably high thermal stability and high strength and modulus, the fibers are of significance for special technical uses.

Fibers from other aromatic homopolyamides or copolyamides have in principle similar properties, but up to now there is no comparison yet between their technical importance and that of PPDT. This is even more true as far as blends of aromatic polyamides are concerned. In NL-A-6908984, for instance, (Examples XV–XVII) incidental mention is made of a blend of PPDT and poly-p-benzamide. Apparently, this blend does not offer any special advantages.

Especially in technical uses where dynamic loading plays a role, as in automobile tires, V-belts, hose materials, cables and ropes, the mechanical behaviour of the well-known fibers from aromatic polyamides is not always optimal. Particularly there is need for fibers which, while retaining a high strength possess a relatively high elongation, a lower initial modulus and a better resistance to mechanical wear and which can be obtained directly by the usual as-spun method, i.e. without use being made of any special treatment other than washing and drying. In U.S. Pat. No. 4,016,236 a process for manufacturing PPDT fibers is described which fibers tend to possess modulus and elongation values in the above sense. However, this process requires that the as-spun fibers are washed and dried under essentially tensionless condition, which is not an attractive proposition for technical production.

A blend of aromatic polyamides has now been found from which fibers are obtained displaying properties improved in the respect mentioned above.

According to the invention the blend is characterized in that it is composed of poly-p-phenylene terephthalamide (PPDT) and, based on the blend, up to 50% by weight of a second polyamide containing diaminobenzanilide units to an extent such that at least 0,1% by weight thereof is present in the blend, said second polyamide being derived from aromatic monomers selected from the group comprising terephthalic acid, 4,4'-diaminobenzanilide, p-phenylene diamine and p-aminobenzoic acid.

It has been found that the use of said second polyamide, which as regards overall chemical composition and structure is related to PPDT, results in a blend leading to fibers having the envisaged properties. This might have to do with the presence in the second polyamide of diaminobenzanilide units. These units, even if present to a low degree, lead to an improvement of PPDT properties in the sense envisaged.

For practical purposes it is desirable that based on the blend, the second polyamide to be blended with PPDT contains at least 0.1% by weight of diaminobenzanilide units. As regards use on an industrial scale, however, the second polyamide should not be employed in the blend in a proportion higher than 50% by weight, even considering its possibility favourable effect on properties. On the contrary, depending on the effect to be attained, it is preferred that the second polyamide, which is to be prepared separately after all, should be blended with PPDT in an amount which is to be kept at low as possible. It is therefore more favorable for the second polyamide to be used in an amount of less than 30% by weight and preferably of less than 10% by weight.

Apart from being derived from terephthalic acid, the second polyamide may in principle be derived from different monomeric aromatic amines, provided that upon blending with PPDT the blend contains at least 0.1% by weight of diaminobenzanilide. The simplest polyamide in this respect is poly-4,4'-diaminobenzanilide terephthalamide (4,4'-DABT), derived from terephthalic acid and 4,4'-diaminobenzanilide. Other obvious variants, however, are copolyamides derived from these monomers and p-phenylene diamine and/or p-aminobenzoic acid. Although technically less attractive, use may also be made of a copolyamide derived from terephthalic acid, p-phenylene diamine and p-aminobenzoic acid. Use may of course also be made of blends of said second polyamides.

The invention will be further described hereinafter mainly with reference to 4,4'-DABT as the second polyamide. This further description is of course not be construed as limiting the scope of the present invention, but merely given for the sake of convenience.

It has been found that whereas fibers from the homopolyamides PPDT and 4,4'-DABT separately display a practically identical behaviour, fibers from these polyamides blended within the range indicated show a surprisingly different elastic behaviour.

FIG. 1 typifies this different elastic behaviour. In it are shown the force (F)-elongation (E) curves measured on the three types of fibers obtained under otherwise identical spinning conditions.

FIG. 2 shows how in the entire blending range from zero to 100% 4,4'-DABT the maximum force or tenacity ($F_{max}$) remains practically the same, whereas the maximum elongation or elongation at rupture ($E_{max}$) is subject to variation.

FIG. 3 demonstrates the variations in elastic behaviour throughout the blending range with reference to the ratio $F_{max}$ to $F_{1\%}$ (force at 1% elongation, also referred to as the 1% LASE).

The graphs show that the variation in elastic behaviour is asymmetrical, which clearly manifests itself in the blending range below about 50% by weight of 4,4'-DABT.

Accordingly, fibers from blends which in addition to PPDT contain over 0.1 up to 50% by weight of 4,4'-DABT are of practical importance here. The aforementioned lower limit of 0.1% by weight of diaminobenzanilide units corresponds to 0.16% by weight of DABT. Fibers from blends within this composition have as a rule an $F_{max}$ to $F_{1\%}$ ratio of at least 4.0 and an elongation at rupture of at least 3.5%. Because of the higher elongation at rupture also the breaking energy is considerably increased.

Preferred are fibers from blends containing less than 10% by weight of 4,4'-DABT. As appears from FIG. 1, the initial modulus of such fibers is practically half of that of homopolymer fibers. Their $F_{max}$ to $F_{1\%}$ ratio is as a rule at least 5 and their elongation at rupture at least 4%.

The polyamide components of the present mixtures are known in themselves and may be obtained by the usual methods. For instance, PPDT is obtained by polymerization, in a suitable solvent, of p-phenylene diamine and terephthaloyl dichloride, and 4,4'-DABT by polymerization of 4,4'-diaminobenzanilide and terephthaloyl dichloride. The polymers should have a viscosity which is sufficiently high for fibres, which amounts to an inherent viscosity of at least 2.5 and preferably higher than 4.0. U.S. Pat. No. 4,308,374 describes a particularly suitable method of preparing these polymers as far as PPDT is concerned.

By inherent viscosity is to be understood here the value calculated in accordance with $\eta_{inh} = \ln \eta_{rel}/0.5$, where $\eta_{rel}$ is the relative viscosity measured with a capillary viscometer at 25° C. of a solution of 0.5 g polyamide in 100 ml of 96% -sulphuric acid.

The procedure for spinning fibers from solutions of aromatic polyamides in concentrated sulphuric acid is generally known and requires no further description here. A special method which is particularly suitable notably for PPDT is described in U.S. Pat. No. 4,320,081. To achieve and preserve the properties as envisaged with the present invention it is generally advisable to keep the fiber tension in the wash and drying section as well as the drying temperature within limits. For example the tension preferably is adjusted to about 0.01–0.03N/tex and the drying temperature at 100° to 200° C.

The fibers according to the invention, as they are obtained by the spinning process after drying, display the behaviour elucidated with reference to FIGS. 1 to 3. Further, it has been found that also the fatigue behaviour has considerably improved. In a bend-abrasion test bend-abrasion values are measured that are higher by a factor of 2 or 3.

A suitable bend-abrasion test comprises the use of the following set up. On a horizontally clamped filament (the static filament) are transversely placed at short intervals 10 filaments of the same material (the dynamic filaments) which are bent through an angle of 90 degrees. The static filament and the dynamic filaments are all loaded with the same weight, in the present case: 1.8 cN/tex. The dynamic filaments are then moved to-and-fro over the static filament within fixed limits and of each dynamic filament the number of cycles to rupture is recorded.

This test measures bend-abrasion values of 10,000 and 8100 for the homopolyamides PPDT and 4,4'-DABT, respectively, and of 20,000 and 26,000 for blends having PPDT/DABT blend ratios of 98/2 and 95/5, respectively.

Of practical importance is that the improvement displayed by the behaviour of the blend filaments is retained after a heat treatment or hot-afterdrawing. In that case the bend-abrasion values are found to be even higher and at the above blend ratios values of 42,000 and 40,000, respectively, are obtained after a thermal treatment for 5 minutes at 150° C. The values thus obtained are especially of importance when the fibers are to be used as reinforcing material in rubber.

The term fibers used in the present specifications covers all usual types of fibers, irrespective of their length, from staple fibers to endless filaments. In view of the properties it is especially the yarns made from the fibers according to the invention, more particularly tire yarn, that are considered to be of importance.

The invention will be further described in the following examples on the basis of results obtained in experiments.

EXAMPLE I a. Preparation of PPDT

In accordance with the procedure in Example VI of U.S. Pat. No. 4,308,374, but on a larger scale, PPDT was prepared in a mixture of N-methyl pyrrolidone and calcium chloride at a calcium chloride content of 9.5%, by weight, calculated on the total reaction mass. The ratio of the monomers p-phenylene diamine and terephthaloyl dichloride was 0.997 and the total monomer concentration was 13% by weight, calculated on the total reaction mass. After neutralizing, washing and drying a polymer was obtained having an inherent viscosity of 5.1.

b. Preparation of 4,4'-DABT

The same procedure was used for preparing DABT in a 160 l-reactor and in a medium of 56.5 kg of N-methyl pyrrolidone and 7.99 kg of calcium chloride. The monomer concentration was again about 13% by weight, use being made of 5,016 kg of 4,4'-diaminobenzanilide and 4,511 kg of terephthaloyl dichloride. The reaction time was ninety minutes and the temperature 60° C. Obtained was a polymeric product having an inherent viscosity of 4.9.

c. Preparation of Spinning Solutions

As solvent was used concentrated sulphuric acid having a strength of 99.8%. Except for PPDT alone the solutions were prepared by mixing 2010 g of sulphuric acid and 496 g of total polymer in a mixer at a temperature of 85° C. and at a subatmospheric pressure below 0.1 bar. The resulting homogeneous solutions were transferred to a spinning machine, from where they were spun from a heated double-walled vessel.

The PPDT solution was prepared via mixing the polymer with solid, cooled sulphuric acid, as described in Example III of U.S. Pat. No. 4,320,081.

d. Spinning Procedure

The polymer solutions having a polymer content of about 19,8% by weight were spun by the air gap spinning method essentially as described in Example III of U.S. Pat. No. 4,320,081, employing a spinneret with 330 orifices each having a diameter of 80 $\mu$m. Use was made of a spinning temperature of 80° C., a winding speed of 100 m/min and a coagulation bath temperature of 14° C. In the coagulation bath the filaments were passed through a vertically positioned spinning tube having a length of 15 mm and a diameter of 12 mm and guided over a ceramic pin. The resulting filaments were wound up at a tension below 0.02N/tex and washed in water 14° C., neutralized in a 1% by weight-sodium carbonate solution of 60° C. and subsequently washed in water of 60° C. Finally, the filaments were dried to the air.

e. Filament Tensile Tests

The stress-strain data were collected in conformity with ASTM D 2101 by conducting tensile tests on individual filaments with the aid of an Instron tensile tester. The nominal gauge length was 0.10 m and the rate of extension 0.01 m/min. The filaments had previously been conditioned at 20° C. and a relative humidity of 65%. For each type of filament the average result of 10 filament tensile tests was calculated.

A. Test Results For Ready Filaments

Spread over the entire blending range from 100% PPDT to 100% 4,4'-DABT filament tensile tests were carried out and the results obtained are given in the table below.

TABLE A

| Polymer blend PPDT/DABT | Linear density dtex | $F_{1\%}$ mN/tex | $F_{max}$ mN/tex | $E_{max}$ % | $F_{max}/F_{1\%}$ |
|---|---|---|---|---|---|
| 100/0 | 2,1 | 619 | 1910 | 3,1 | 3,1 |
| 98/2 | 1,9 | 370 | 1832 | 3,9 | 4,9 |
| 95/5 | 2,0 | 367 | 2070 | 4,2 | 5,6 |
| 90/10 | 2,0 | 301 | 1810 | 4,4 | 6,0 |
| 80/20 | 2,1 | 293 | 1928 | 4,6 | 6,6 |
| 60/40 | 1,9 | 364 | 1876 | 4,0 | 5,1 |
| 40/60 | 2,0 | 549 | 1860 | 3,4 | 3,4 |
| 10/90 | 2,0 | 622 | 1743 | 2,9 | 2,8 |
| 0/100 | 1,9 | 669 | 1917 | 3,0 | 2,9 |

The different elastic behaviour of the blend filaments is illustrated in FIG. 1 by the complete stress-strain curves of the homopolymers PPDT (blend 100/0) and 4,4'-DABT (blend 0/100) and of the 90/10 blend polymer. Clearly, the tenacity ($F_{max}$) remains practically the same, the initial modulus is more than half as low and the elongation at rupture ($E_{max}$) is about 1½ times as high.

FIGS. 2 and 3 give the variations in $E_{max}$ and the ratio $F_{max}$ to $F_{1\%}$ (tenacity at 1% elongation) throughout the blending range. Apparently, a small proportion of DABT in the blend already results in a favourable change in properties.

B. Test Results for Thermally Aftertreated Filaments

Tensile tests were also applied to filaments from homopolymers and the 90/10 blend after the filaments had been subjected to a thermal treatment.

The thermal treatment comprised three separate tests: a heat resistance test to which filaments wound on glass tubes were subjected for 1 hour at 250° C., and two drawing tests, in which the filaments while under drawing tension were passed with a speed of 9 m/min through a nitrogen filled tubular oven 0.6 m long at a temperature of 400° C. and 500° C., respectively. The results of these tests are summarized in the table below.

TABLE B

| Polymer blend PPDT/DABT | after treatment temp. °C. | after treatment time s | drawing tension mN/tex | linear density dtex | $F_{1\%}$ mN/tex | $F_{max}$ mN/tex | $E_{max}$ % | $F_{max}/F_{1\%}$ |
|---|---|---|---|---|---|---|---|---|
| 100/0 | — | — | — | 2,7 | 650 | 2100 | 3,2 | 3,2 |
|  | 250 | 3600 | — | 2,5 | 718 | 2025 | 2,8 | 2,8 |
|  | 400 | 2,5 | 50 | 2,5 | 780 | 2075 | 2,6 | 2,6 |
|  | 500 | 2,5 | 50 | 2,6 | 806 | 1978 | 2,4 | 2,4 |
| 90/10 | — | — | — | 2,4 | 323 | 1860 | 4,3 | 5,7 |
|  | 250 | 3600 | — | 2,6 | 376 | 1767 | 3,8 | 4,7 |
|  | 400 | 2,5 | 46 | 2,5 | 478 | 1815 | 3,3 | 3,8 |
|  | 500 | 2,5 | 50 | 2,6 | 491 | 1890 | 3,1 | 3,8 |
| 0/100 | — | — | — | 2,5 | 652 | 1977 | 3,2 | 3,0 |
|  | 250 | 3600 | — | 2,4 | 693 | 1920 | 2,6 | 2,8 |
|  | 400 | 2,5 | 50 | 2,4 | 744 | 1930 | 2,5 | 2,6 |
|  | 500 | 2,5 | 63 | 2,4 | 909 | 1900 | 2,0 | 2,1 |

The table shows that apart from the predictable effect of a thermal aftertreatment on the elongation and modulus behaviour, the (90/10) blend filaments continue to display a more favourable behaviour than those from the homopolymers. This implies that when the blend filaments are used in rubber (tire yarn), these favorable properties will still be present after vulcanization.

EXAMPLE II

In the manner described for 4,4'-DABT in Example I, a copolyamide was prepared from 0,4707 kg of 4,4'-diaminobenzanilide, 30,222 kg of p-phenylene diamine and 6,133 kg of terephthaloyl dichloride. After neutralization, washing and drying a polymer was obtained having an inherent viscosity of 5.

Also as described in Example I, spinning solutions were spun of the copolyamide itself and of PPDT/copolyamide blends in the blending ratios 90/10 and 98/2. Thus, the proportions of diaminobenzanilide units in these blends were 0,6% by weight and 0,13% by weight, respectively. The resulting filaments were subjected to tensile tests, the results of which are summarized in Table C.

TABLE C

| Polymer blend PPDT/Copolyamide | Linear density dtex | $F_{1\%}$ mN/tex | $F_{max}$ mN/tex | $E_{max}$ % | $F_{max}/F_{1\%}$ |
|---|---|---|---|---|---|
| 0/100 | 2,0 | 562 | 1555 | 2,7 | 2,8 |
| 90/10 | 2,0 | 314 | 1653 | 4,1 | 5,3 |
| 98/2 | 2,2 | 358 | 1710 | 3,9 | 4,8 |

The table shows that even at a content of diaminobenzanilide units as low as that in the 98/2 blend the properties obtained display a distinct improvement.

What is claimed is:

1. Fibers entirely or substantially consisting of a blend of aromatic polyamides, characterized in that the blend is composed of poly-p-phenylene terephthalamide and, based on the blend, up to 50% by weight of a second polyamide containing diaminobenzanilide units to an extent such that at least 0,1% by weight thereof is present in the blend, said second polyamide being derived from aromatic monomers selected from the group comprising terephthalic acid, 4,4'-diaminobenzanilide, p-phenylene diamine and p-aminobenzoic acid.

2. Fibers according to claim 1, characterized in that the blend contains less than 10% by weight of the second polyamide.

3. Yarn, more particularly tire yarn, entirely or partly composed of fibers according to any one of the preceding claims.

* * * * *